(12) United States Patent
Kono (10) Patent No.: US 6,889,647 B2
(45) Date of Patent: May 10, 2005

(54) CONNECTOR ASSEMBLY (75) Inventor: Masakazu Kono, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 20 days.

(21) Appl. No.: 10/610,077

(22) Filed: Jun. 30, 2003

(65) Prior Publication Data

US 2004/0003792 A1 Jan. 8, 2004

(30) Foreign Application Priority Data

Jul. 8, 2002 (JP) ........................................ 2002-199237

(51) Int. Cl.[7] ............................................. F02M 35/10
(52) U.S. Cl. ............................ 123/184.21; 123/184.46; 285/236
(58) Field of Search ....................... 123/184.21, 184.46, 123/184.32, 184.39; 285/236, 253, 232, 252, 235

(56) References Cited

U.S. PATENT DOCUMENTS

| 4,380,348 A | * | 4/1983 | Swartz ........................ 285/236 |
| 4,922,583 A | * | 5/1990 | Wentworth ................... 24/279 |
| 5,809,959 A | * | 9/1998 | Martinsson ............ 123/184.21 |
| 6,519,815 B2 | | 2/2003 | Cassel et al. |

* cited by examiner

Primary Examiner—Andrew M. Dolinar
Assistant Examiner—Katrina Harris
(74) Attorney, Agent, or Firm—Knobbe, Martens, Olson & Bear, LLP (57) ABSTRACT A connector assembly including the resilient member and two band clamps includes a feature for preventing the band clamps from overlapping with each other when the band clamps are tightened. The band clamps can include projections extending from an outer surface thereof in order to prevent the band clamps from overlapping with each other. Alternatively, one of the members that are being connected via the connector assembly can include an additional member configured to be aligned with a projection on one of the band clamps.

21 Claims, 7 Drawing Sheets

CONNECTOR ASSEMBLY

PRIORITY INFORMATION

The present application is based on and claims priority to Japanese Patent Application No. 2002-199237, filed Jul. 8, 2002, the entire contents of which are hereby expressly incorporated by reference.

BACKGROUND OF THE INVENTION

1. Field of the Invention

The present application is directed to connector assemblies, and more particularly, to connector assemblies including band clamps.

2. Description of the Related Art

Clamps for joining and sealing tubular conduits in an end-to-end relationship using adjustable metal bands have long been known. Band clamps are sometimes utilized in lap joints. A lap joint is formed when an end of one conduit or pipe having a first diameter is placed inside the end of the second conduit or pipe having a diameter larger than the first diameter. Because the second conduit overlaps the first conduit, it is referred to as forming a lap joint.

Where the larger diameter conduit can be formed from a resilient material or formed with resilient portions, a band clamp can be used to constrict the larger diameter member into a pressing relationship with the smaller diameter member. The constriction provided by the band clamp ensures a good seal at the lap joint.

SUMMARY OF THE INVENTION

One aspect of the invention disclosed herein includes the realization that a band clamp can be modified to prevent misalignment and avoid costly and time-consuming procedures for re-aligning a misaligned band clamp. For example, FIG. 1 illustrates an exemplary environment in which band clamps are commonly used.

Figure 1:
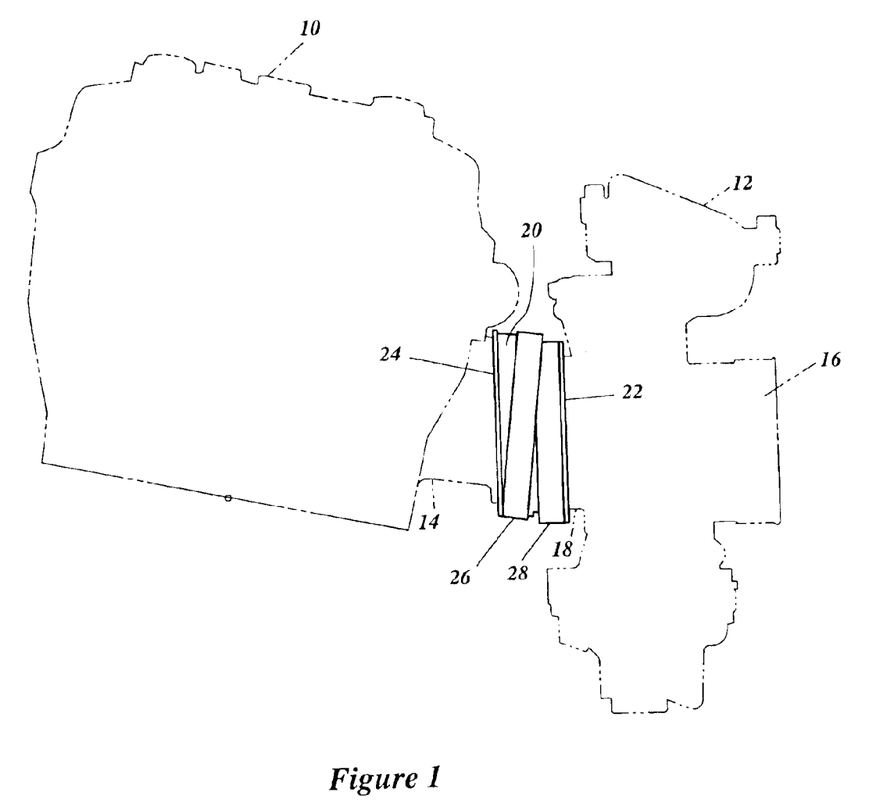
FIG. 1 is a schematic side elevational view of a cylinder head.

In FIG. 1, a cylinder head 10 of a four-cycle internal combustion engine and a carburetor 12 are illustrated in phantom line. The cylinder head 10 includes an inlet duct 14 of an induction port extending toward a combustion chamber defined within the engine. The duct 14 can lead directly to one or multiple intake ports within the cylinder head 10 or could lead to an induction manifold which is configured to divide a flow of induction air between the intake ports for a plurality of cylinders defined within the engine.

The carburetor 12 defines an induction passage 16 extending therethrough. An outlet duct 18 is defined on an outlet end of the carburetor 12.

The carburetor 12 is connected to the cylinder head 10 through a resilient connector 20. The connector 26 has an inlet end 22 and an outlet end 24. The inlet end 22 has an inner diameter that is about the same or slightly larger than the outer diameter of the outlet duct 18. Similarly, the outlet 24 of the connector member 20 has an inner diameter that is the same as or slightly larger than the outer diameter of the inlet duct 14.

In order to provide a leak-proof connection between the outlet duct 18 and the inlet duct 14, first and second band clamps 26, 28 are used to secure the connector 20 to the outlet and inlet ducts 18, 14.

Each of the band clamps 26, 28 include tensioning devices (not shown) which allow a tension in the band clamps 26, 28 to be adjusted. Additionally, the band clamps 26, 28 are sized so as to constrict the outlet and inlet ends 24, 22 into sealing contact with the inlet and outlet ducts 14, 18, respectively.

As noted above, one aspect of at least one of the inventions disclosed herein includes the realization that during the assembly process, because the band clamps 26, 28 are disposed in close proximity to one another, one of the band clamps 26, 28 can slip out of place and overlap the other band clamp, as illustrated in FIG. 1. If such overlapping occurs, the band clamp must be loosened, repositioned, then retightened.

This problem is more significant where such an engine is being assembled in an assembly-line facility. Firstly, the tools used in an assembly line facility are often specialized for the particular assembly procedures performed at discreet workstations along the assembly line. Thus, at a station used for tightening the band clamps 26, 28 illustrated in FIG. 1, a specialized tool such as an electric or pneumatic screw driver or nut driver can be mounted so that an assembly worker can quickly fasten the band clamps 26, 28. Further, such a tool may have a specific size extension or angled universal joint which works particularly well when connecting the carburetor 12 to the cylinder head 10. Such a tool can exert a large torque on the band clamp 26 causing it to quickly slip out of the intended mounting position and overlap the adjacent band clamp 28. Additionally, because the carburetor 12 is mounted in close proximity to the cylinder head 10, the assembly worker may not notice that the band clamp 26 is overlapped with the band clamp 28. Thus, a quality control worker downstream from the worker who tightens the band clamps 26, 28 can stop the engine along the assembly line process and loosen, reposition, then retighten the band clamps 26 or 28.

Such a reinstallation of the band clamps 26, 28 can slow the entire assembly line process, thereby increasing the costs associated with manufacture of the engine. Thus, in accordance with another aspect of at least one of the inventions disclosed herein, an engine includes an engine body defining at lease one combustion chamber therein. The engine also includes an intake air passage having an opening on an exterior of the engine body. An intake air member having an outlet is configured to guide air to the opening. A resilient connector member having an inlet and outlet connects the intake air member to the opening on the exterior of the engine body. A first clamp compresses the inlet of the resilient connector to the outlet of the intake air member. A second clamp compresses the outlet of the resilient connector to the opening of the intake air passage. The first and second clamps include first and second tension adjuster devices, respectively. At least one of the first and second clamps also includes a projection spaced from the corresponding tension adjuster device and is configured to prevent the clamps from overlapping each other.

In accordance with a further aspect of at least one of the inventions disclosed herein, a band clamp comprises a circumferentially extending body member. A tension adjuster device is configured to adjust tension in the body member. Additionally, the band clamp includes a projection extending radially outwardly from the body member and is spaced circumferentially from the tension adjuster device.

In accordance with yet another aspect of at least one of the inventions disclosed herein, a connector assembly comprises a resilient connector member having first and second connector flanges. A first band clamp is configured to restrict the first connector flange. The first band clamp comprises of first band member and a first tensioning device configured to adjust a tension in the first band member. A second band clamp is configured to constrict the second connector flange. The second band clamp comprises a second band member and a second tensioning device configured to adjust a tension in the second band member. At least the first band member further comprises a first projection extending outwardly from an outer surface of the first band member and is circumferentially spaced from the first tensioning device.

In accordance with another aspect of at least one of the inventions disclosed herein, a connector assembly comprises of resilient connector member having first and second connector flanges. A first band clamp is configured to constrict the first connector flange. The first band clamp comprises a first band member and a first tensioning device configured to adjust a tension in the first band member. A second band clamp is configured to constrict the second connector flange. The second band clamp, comprises a second band member and a second tensioning device configured to adjust a tension in the second band member. Additionally, the connector assembly comprises means for preventing the first band member from overlapping a portion of the second band member that is spaced from the second tensioning device.

BRIEF DESCRIPTION OF THE DRAWINGS

FIG. 1 illustrates a cylinder head and a carburetor illustrated in phantom and a connector member connecting the carburetor to the cylinder head with first and second band clamps in which the first band clamp has overlapped the second band clamp.

DETAILED DESCRIPTION OF THE PREFERRED EMBODIMENT

Figure 2:
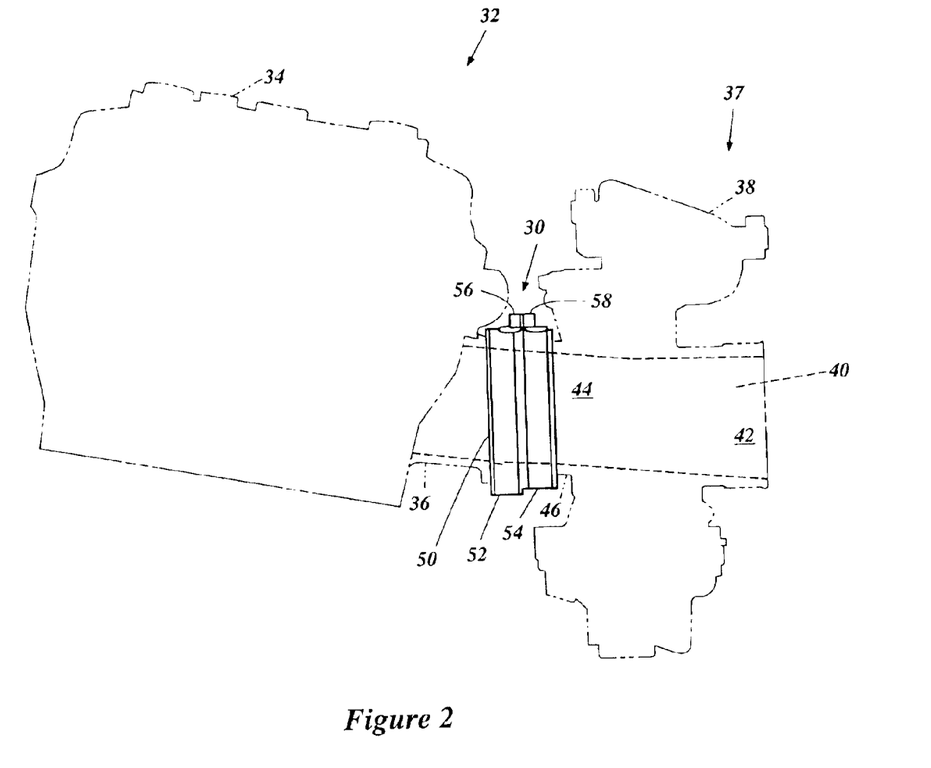
FIG. 2 is a schematic side elevational view of a portion of an internal combustion engine constructed in accordance with an aspect of at least one of the inventions disclosed herein, in which a cylinder head and a carburetor are illustrated in phantom and a connector assembly, including two band clamps, are illustrated in solid line.

With initial reference to FIG. 2, a connector assembly 30 constructed in accordance with a least one of the inventions disclosed herein, is illustrated as being incorporated into the design of an internal combustion engine 32, a portion of which is illustrated in FIG. 2. The internal combustion engine 32 represents one preferred environment of use of the connector assembly 30.

In particular, the internal combustion engine 32 is a four-cycle engine. However, the connector assembly 30 can be used in numerous other environments, such as, for example, but without limitation, exhaust systems of internal combustion engines, cooling systems of internal combustion engines, two-cycle engines, diesel engines, rotary engines, land, sea, air, vehicles, as well as non-automotive applications including household or commercial plumbing, etc. Thus, the internal combustion engine 32 is intended only to illustrate one preferred environment of use. One of ordinary skill in the art will recognize that the connector assembly 30, as well as the other modifications illustrated in the remaining figures, can provide beneficial advantages in numerous other environments of use.

The engine 32, as noted above, operates under the four-stroke combustion principal. Thus, the engine 32 includes a cylinder head 34 which defines, along with a cylinder block (not shown) and a piston (not shown), at least one combustion chamber (not shown) within the engine 32. Additionally, the cylinder head 34 includes at least one intake valve and at least one exhaust valve which control the flow of induction air or air fuel charges into the combustion chamber and the flow of exhaust gases out of the combustion chamber. As known in the art, the intake valve opens and closes an intake port which extends from the combustion chamber to an outer portion of the cylinder head 34.

An intake duct 36 extends from an outer surface of the cylinder head 34. The intake duct 36 defines an induction passage that communicates with the intake port.

In some engines, the intake duct 36 is part of an intake manifold and thus includes a single inlet and a plurality of outlets. In other applications, the intake duct 36 has a single inlet and a single outlet. Additionally, in some applications, the engine 32 can include multiple intake ports. Thus, the outlet end of the intake duct 36 can be split so as to divide a flow of air flowing therethrough into multiple streams aligned with the plural intake ports.

Where the engine 32 is a two-cycle crankcase compression type engine, the intake duct would extend into the crankcase (not shown) of the engine 32. Additionally, a reed valve is typically used to prevent the reverse flow of air out of the intake duct 36.

The illustrated engine 32 also includes a carburetor 38. As is typical of all carburetors, the carburetor 38 includes a central induction passage extending therethrough. Additionally, the carburetor 38 includes a throttle valve (not shown) disposed in the induction passage 40. An inlet end 42 of the induction passage 40 can be opened to atmospheric air, but more typically is connected to an induction silencing system for providing a smooth air flow to the inlet 42. Additionally, the induction system can include a filter for filtering the air before reaching the carburetor 38. An outlet end 44 of the carburetor is defined in part by an outlet duct 46.

Additionally, the carburetor 38 includes a jet for mixing fuel with the air traveling through the induction passage 40. In operation, the throttle valve controls the flow of air flowing through the induction passage 40. Additionally, by changing the flow of air through the induction passage 40, the amount of fuel introduced into the air stream from the fuel jet also changes.

Where the engine 32 is a fuel-injected engine, the induction device 37 can be in the form of a simple throttle body. As such, the induction device 37 can be configured as a duct having a support for a throttle valve and perhaps a throttle valve linkage. Further, where the engine 32 has infinitely variable valve timing and duration, the induction device 37 can be further simplified. For example, the induction device 37 can be simply a tuned induction passage configured to provide a desired air flow of air into the intake duct 36, without a throttle valve.

The connector assembly 30 includes a resilient connector member 50 and first and second band clamps 52, 54. In the illustrated embodiment, the band clamps 52, 54 include first and second projections 56, 58, respectively.

Figure 3:
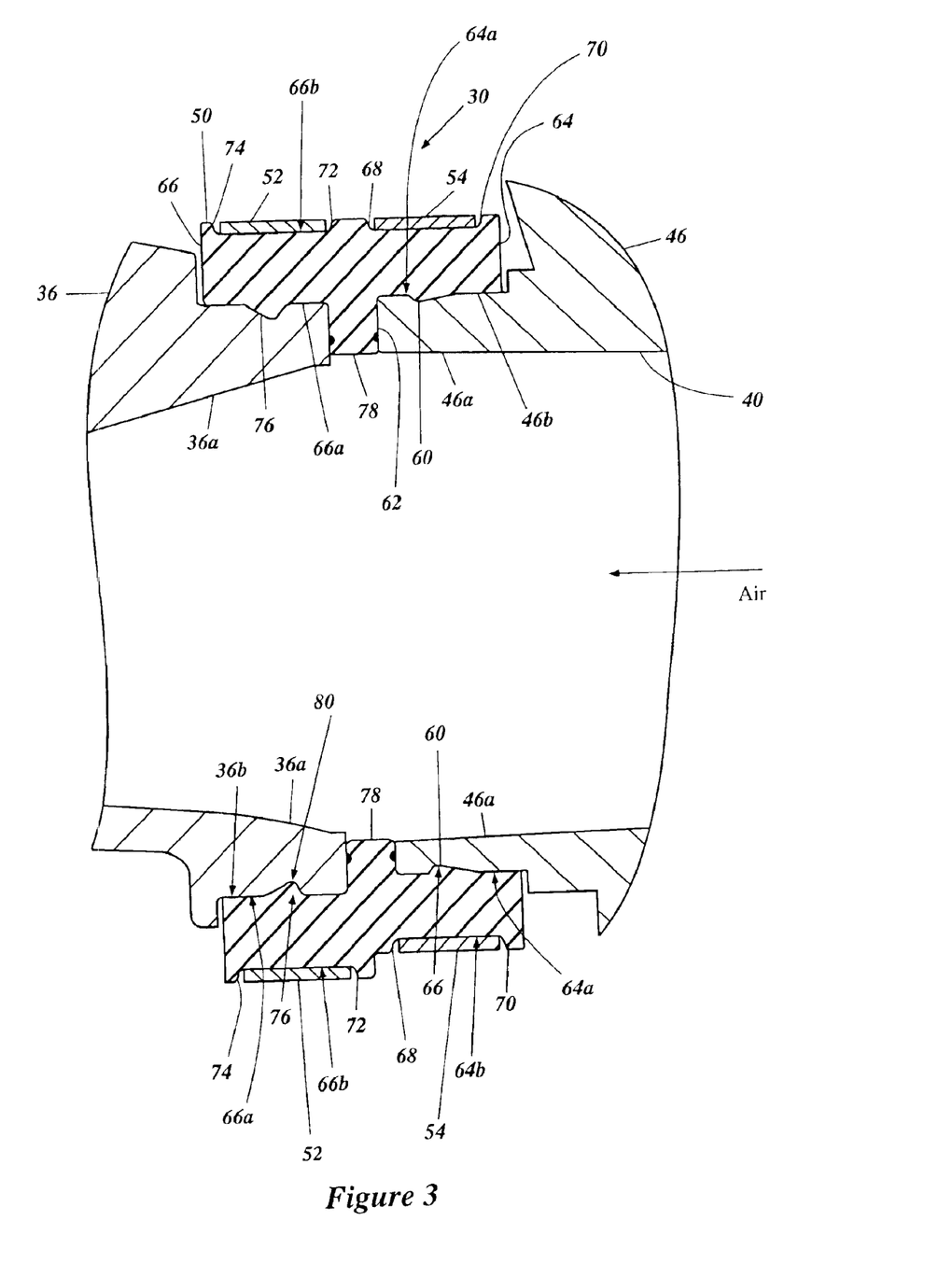
FIG. 3 is a partial sectional view of an outlet of the carburetor, an inlet of the cylinder head, and the connector member of FIG. 2.

With reference to FIG. 3, the connector assembly 30 and its connections with the intake duct 36 and the outlet duct 46 are illustrated in greater detail. As shown in FIG. 3, the outlet flange 46 of the induction device 37 and the inlet flange 36 of the engine 32 cooperate to define the intake passage 40.

The outlet flange 46 of the induction device 37 includes an inner surface 46a. The inner surface 46a defines an inner diameter of the outlet flange 46. However, it is to be understood that the inner surface 46a can have a shape other than round, for example, but without limitation, oblong, oval, elliptical, or rectangular. The outlet flange 46 also includes an outer surface 46b. The outer surface 46b defines an outer diameter of the outlet flange 46. However, as noted above with respect to the inner surface 46a, the outer surface 46b can define shapes other than round, including, for example, but without limitation, oblong, oval, elliptical, and rectangular.

Optionally, the outer surface 46 can include an annular recess 60 adjacent a terminal end 62 of the outlet flange 46. As such, the annular recess 62 provides a surface feature which can be used to enhance a seal between the outlet flange 46 and the resilient connector body 50. Additionally, the annular recess 60 can provide a tactile response to an assembly worker who installs the connector body 50 onto the outlet flange 46, described in greater detail below.

The resilient connector body 50 includes and first connector flange 64 and a second connector flange 66. The first connector flange 64 is configured to engage the outlet duct 46. The body 50 can be made from any material that can be shaped so as to be resilient. Preferably, the connector body is formed from a fuel resistant material such as rubber. Of course, however, the body 50 can be formed from other materials, depending on the environment of use.

In the illustrated embodiment, the inlet flange 64 includes an inner surface 64a. The inner surface 64a defines an inner diameter of the inlet flange 64. As noted above with respect to the outer surface 46b of the outlet flange 46, the inner surface 64a of the inlet flange 64 can define shapes other than round, for example, but without limitation, oblong, oval, elliptical, and rectangular.

Preferably, the inner surface 64a is sized to provide a close fitting engagement with the outer surface 46b of the outlet flange 46. More preferably, the inlet flange 64 is sized so as to provide an interference fit with the outlet flange 46. Thus, for example, the inner diameter of the inner surface 64a can be sized so that, in a relaxed state, the inner diameter is about the same diameter as the outer surface 46b, or is slightly smaller than the outer surface 46b.

Additionally, the inlet flange 64 also preferably includes an annular projection 66 extending inwardly from the inner surface 64a. Preferably, the annular projection 66 is configured to be aligned with the annular recess 60. Thus, the projection 66 and the recess 60 can cooperate to provide a tactile response to an assembly worker when the assembly worker fits the body 50 onto the outlet flange 64.

For example, when an assembly worker moves the inlet flange 64 and the outlet flange 46 toward each other, a tactile response will be produced when the projection 66 snaps into the recess 60. Further, the projection 66 and the recess 60 can further enhance the sealing engagement between the outer surface 46a of the outlet-flange 46 and the inner surface 64a of the inlet flange 64.

The inlet flange 64 also includes an outer surface 64b. The outer surface 64b preferably is bounded by inner and outer guide walls 68, 70. As such, the inner and outer guide walls 68, 70 of outer surface 64b provide an annular channel around the inlet flange 64 into which the band clamp 54 can fit. Thus, the guide walls 68, 70 provide a further advantage in helping to maintain the band clamp 54 in position around the inlet flange 64 before the band clamp 54 is tightened around the inlet flange 64.

The outlet flange 66 of the body 50 has a similar construction to the inlet flange 64. Thus, the outlet flange 66 includes an inner surface 66a, an outer surface 66b and inner and outer guide walls 72, 74. Preferably, the outer flange 66 also includes a projection 76 configured to engage a recess on the inlet duct 36, described in greater detail below.

Optionally, the connector body 50 can include a spacer portion 78. Preferably, the spacer portion 78 is sized so as to extend inwardly from the inlet and outlet flanges 64, 66 so as to define a spacing-between the outlet duct 46 and the inlet duct 36. In the illustrated embodiment, the spacer portion 78 extends inwardly and is sized to rest against the blunt end 62 of the outlet duct 46 and a blunt end of the inlet duct 36, described in greater detail below. Further, in this arrangement, the spacer portion 78 defines a portion of the induction passage 40. This arrangement provides enhanced thermal and vibration isolation of the induction device 37 from the engine 32. However, such a spacing function can be eliminated in this or other environments of use of the connector assembly 30.

With continued reference to FIG. 3, the inlet duct 36 includes an inner surface 36a and an outer surface 36b. Preferably, the outer surface 36b also includes an annual recess 80 configured to receive the annular projection 76. As described above with reference to the recess 60 and the projection 66, the recess 80 and the projection 66 can cooperate to enhance the sealing engagement of the inner surface 66a and the outer surface 36b and/or provide a tactile response for an assembly worker attaching the resilient body 50 to the inlet duct 36.

In the illustrated embodiment, the inner surface 36a tapers inwardly in the direction of air flow. Additionally, the outer surface 36b defines a diameter that is larger than the outer surface 46b. However, these differing diameters and shapes are associated with the illustrated environment of use of the connector assembly 30. Of course, the connector assembly 30 can be used to connect other types of pipes, ducts, or conduits having uniform inner surfaces or inner surfaces that vary to a greater extent than those illustrated in FIG. 3.

Figure 4:
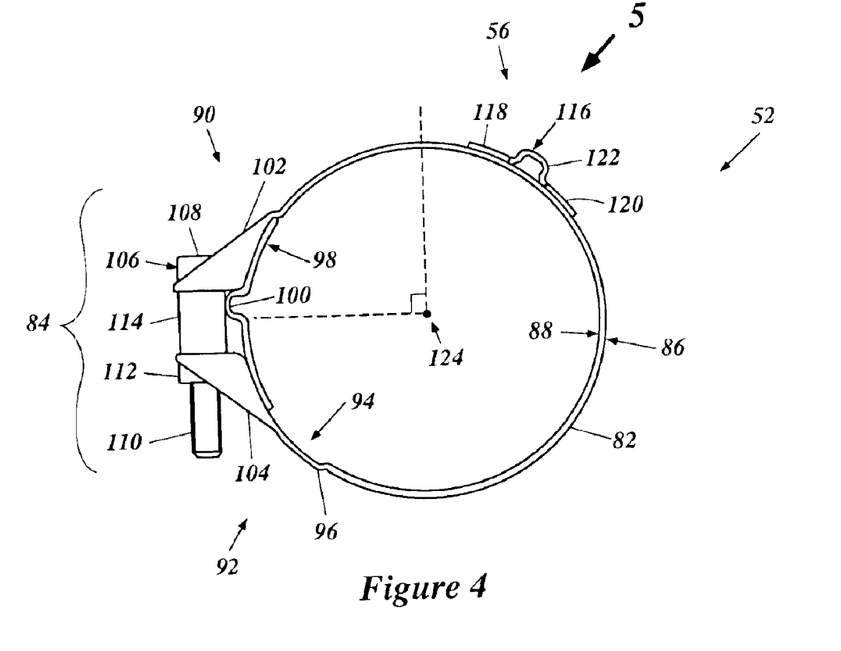
FIG. 4 is a front elevational view of one of the band clamps illustrated in FIG. 2.
Figure 5:
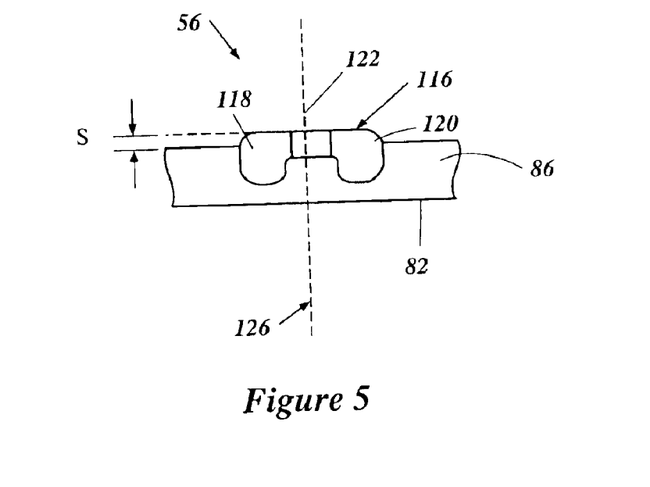
FIG. 5 is an enlarged plan view of the band clamp of FIG. 4 taken as viewed along arrow 5 illustrated in FIG. 4.

With reference to FIGS. 4 and 5, the band clamp 52 includes a band member 82, a tensioning device 84 and the projection 56. The band clamp 56 can be of the type in which the band member 82 is biased toward a constricted position and the tensioning member 84 is configured to allow a user to selectively enlarge the band member 82.

Alternatively, the band clamp 56 can be of the type in which the band member 82 is biased toward an enlarged state and the tensioning device 84 is configured to allow a user to selectively constrict the band member 82 against its biasing force. Finally, the band clamp 56 can be of the type in which the band member 82 is not significantly biased toward a constricted or expanded state, and wherein the tensioning device 84 is configured to allow a user to selectively enlarge or constrict the band member 82.

In the illustrated embodiment, the band member 82 is generally circular in shape. The band member 82 can be made from any type of material including, for example, but without limitation, regular steel, spring steel, aluminum, nylon, or plastic. The band member has an outer surface 86 and an inner surface 88. Additionally, in the illustrated embodiment, the band member 82 is formed into a generally round and circumferentially extending shape. The band member 82 also includes first and second ends 90, 92 which cooperate with the tensioning device 84 so as to allow a tension in the band member 82 to be adjusted.

As shown in FIG. 4, the inner surface 88 of the band member 82 includes a recess 94. In the illustrated embodiment, the recess 94 is formed as a step 96 in the band member 82.

A limit member 98 is disposed in the recess 94 so as to provide a limit on the constricted state of the band clamp 56. In the illustrated embodiment, the limit member 98 includes a projection 100 that extends between the ends 90, 92 of the band member 82. Thus, when the ends 90, 92 are moved toward the most constricted state of the band member 82, the projection 100 defines a stop so as to limit the minimum spacing of the ends 90, 92. In the illustrated embodiment, the limit member 98 is securely attached to the end 90 of the band member 82. Thus, as the ends 90, 92 of the band member 82 are moved toward and away from each, the remaining portion of the limit member 98 can be received in the remaining portion of the recess 94.

In the illustrated embodiment, the ends 90, 92 include flanges 102, 104 respectively. The flanges 102, 104 configured to support the tensioning device 84. In the illustrated embodiment, the tensioning device 84 includes a bolt 106 extending through apertures (not shown) formed in the flanges 102, 104.

The bolt 106 includes a bolt head 108 including a recess configured to receive a Phillips head screw driver, a flat screw driver, an Allen wrench, or the outer surface can be configured to fit into a nut driver, wrench, or socket. The flange 104 can include threads for engaging a threaded portion 110 of the bolt 106.

More preferably, the tensioning device 84 includes a nut 112 threadedly engaged with the threads 110. Further, the nut 112 preferably is securely fastened to the flange 104. Thus, as the bolt 106 is turned, the nut 112 remains stationary, thereby causing the flange 104 to follow the threaded portion 110 of the bolt 106.

Optionally, the tensioning device 84 can include a stopper member 114 disposed between the flanges 102, 104. The stopper member 114 can be configured to define a minimum spacing between the flanges 102, 104 that is greater than the minimum spacing defined by the limit member 98.

In the illustrated embodiment, the stopper 114 includes a central aperture (not shown) through which a portion of the bolt 106 extends. Thus, a portion of the bolt 106 supports the stopper 114 between the flanges 102, 104.

The stopper member 114 can be formed from any material. Preferably, the stopper member 114 is formed from a rubber. However, the stopper 114 can be formed from numerous resilient or rigid materials including, for example, but without limitation, steel, aluminum, plastic, or any polymer. Preferably, the stopper 114 is sized so that when the bolt 106 is tightened, thereby compressing the flanges 102, 104 against the stopper 114, the outlet flange 66 of the resilient member 50 is properly seated against the inlet duct 36. Thus, the stopper member 114 can be used to prevent over tightening of the band clamp 56, and thereby preventing damage to the resilient member 50.

The projection 56 extends from the band member 82. In the illustrated embodiment, the projection 56 extends radially outwardly from the outer surface 86 of the band member 82. In this arrangement, the projection is formed from a projection member 116 having first and second mounting flanges 118, 120. The mounting flanges 118, 120 are configured to mate with portions of the outer surface 86 of the band member 82. Additionally, the projection member 116 includes a centrally extended portion 122 which extends outwardly and is spaced from the outer surface 86. As such the projection 56 can aid in preventing the band clamp 52 from overlapping an adjacent structure, and/or prevent an adjacent structure from overlapping the band clamp 52.

With reference to FIG. 5, a portion of the projection 56 projects from the band member 82 in an axial direction. For example, as shown in FIG. 4, the band member 82 extends around a center 124. A central axis 126 (FIG. 5) extends through the center 124. The outer surface 86 of the band member 82 extends generally parallel to the axis 126.

As noted above; a portion of projection 56 extends a distance S axially from a peripheral edge of the band member 82. This provides a further advantage in preventing the band clamp 52 from overlapping another structure and/or preventing another structure from overlapping the band clamp 52.

The distance S over which the projection 56 extends axially from the band member 82 can be any distance. A further advantage is provided where two band clamps, each of which having a projection, like the projection 56, are disposed adjacent to each other at a predetermined spacing, the distance S is one-half (½) of the predetermined distance, described in greater detail below.

Figure 6:
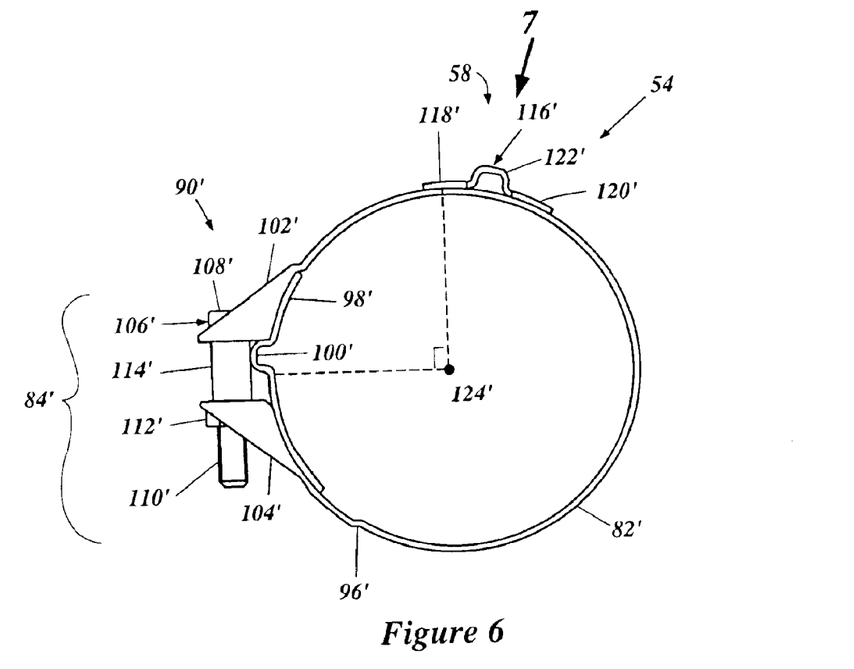
FIG. 6 is an elevational view of the second band clamp illustrated in FIG. 2.
Figure 7:
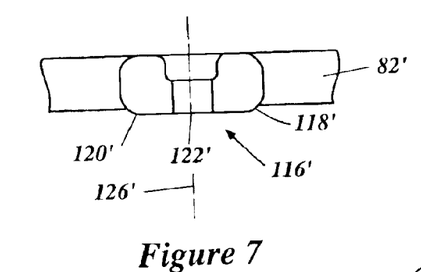
FIG. 7 is an enlarged plan view of the band clamp illustrated in FIG. 6 as viewed along the arrow 7 illustrated in FIG. 6.

With reference to FIGS. 6 and 7, the band clamp 54 can be constructed in an essentially identical manner as the band clamp 52. Thus, the components of the band clamp 54 which are the same or similar to corresponding components of the band clamp 52, have been identified with the same reference numeral, except that a "'" has been added. Additionally, the projection 58 of the band clamp 54 extends from an opposite edge of the band member 82'.

Figure 8:
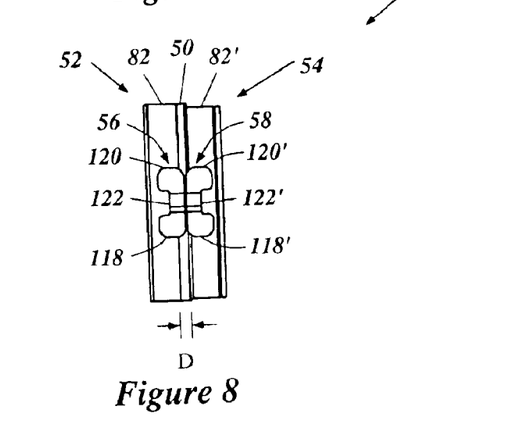
FIG. 8 is a plan view of the first and second band clamps assembled with a connector member illustrated in FIG. 2.

In FIG. 8, the band clamps 52, 54 are illustrated in a position in which they have been tightened against the resilient member 50 and with the projections 56, 58 being generally aligned with each other. In this arrangement the band clamps 52, 54 are spaced at a distance D. Thus, as noted above with reference to FIG. 5, the distance S is preferably equal to about one-half of the distance D.

In this arrangement, when an assembly worker is tightening the band clamps 52, 54, the assembly worker can align the band clamps such that the tensioning devices 84, 84' are juxtaposed to each other. Thus, the bolts 106, 106' are juxtaposed to each other. Thus, when the assembly worker uses a power tool, the assembly worker can quickly and in rapid succession tighten both of the bolts 106, 106'. With the projections 56, 58 aligned as illustrated in FIG. 8, the sudden torque applied to the band clamps 52, 54, prevents the bands of the belt clamps 52, 54 from overlapping each other.

It is to be noted that the projections 56, 58 do not have to be formed in an identical or mirror image of each other as illustrated in FIGS. 4–8. Rather, the projections 56, 58 can be different from each other. Additionally, the projections 56, 58 can be formed in other manners. For example; with reference to FIG. 9, a modification of the band clamps 52, 54 are illustrated therein and refer to generally by the reference numerals 52A, 54A. The components of the band clamps 52A, 54A which are the same or similar to corresponding components of the band clamps 52, 54, are identified using the same reference numerals except that an "A" has been added thereto.

Figure 9:
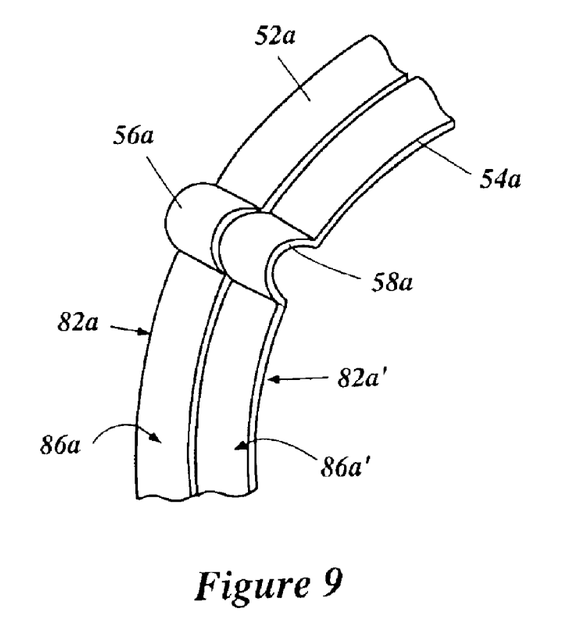
FIG. 9 is a perspective view of a modification of the first and second band clamps illustrated in FIG. 2.

The band clamps 52A, 54A include projections 56A, 58A, respectively. The projections 56A, 58A are formed monolithically with the band members 82A, 82A'. More specifically, the projections 56A, 56B are formed as convex portions of the outer surfaces 86A, 86A' of the band members 82A, 82A', respectively. As such, the projections 56A, 58A can be formed easily with little cost.

Figure 10:
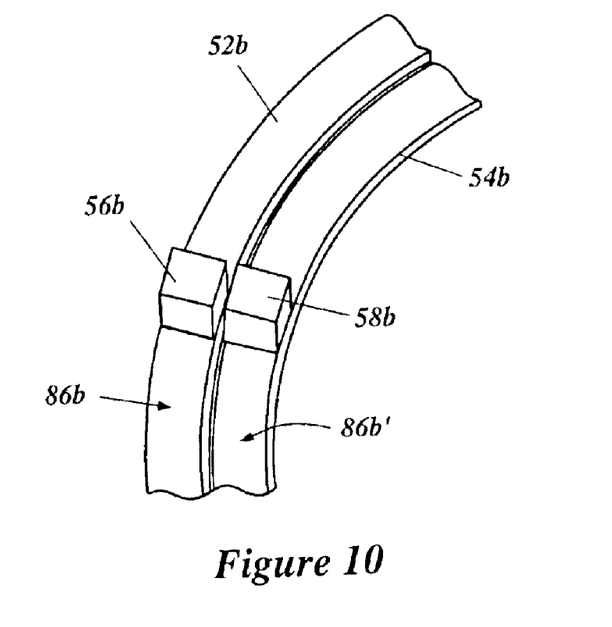
FIG. 10 is a further modification of the band clamps illustrated in FIG. 2.

With reference to FIG. 10, another modification of the band clamps 52, 54 is illustrated therein and referred to generally by the reference numerals 52B, 54B. Components of the band clamps 52B, 54B, which are the same or similar to the band clamps 52, 52A, 54, 54A, are identified with the same reference numerals, except that a "B" has been added.

As shown in FIG. 10, the projections 56B, 58B are in the form of blunt shaped blocks disposed on the outer surfaces 86B, 86B' of the band clamps 52B, 54B. The projections 56B, 58B can have any shape including, for example, but without limitation, round, triangular, oval, elliptical, etc.

Additionally, the projections 56B, 58B can be mounted to the outer surfaces 86B, 86B', respectively, with through any known manner. For example, but without limitation, the projections 56B, 58B can be attached to the outer surfaces 86B, 86B', through adhesive, welding, casting, etc.

Figures 11, 12:
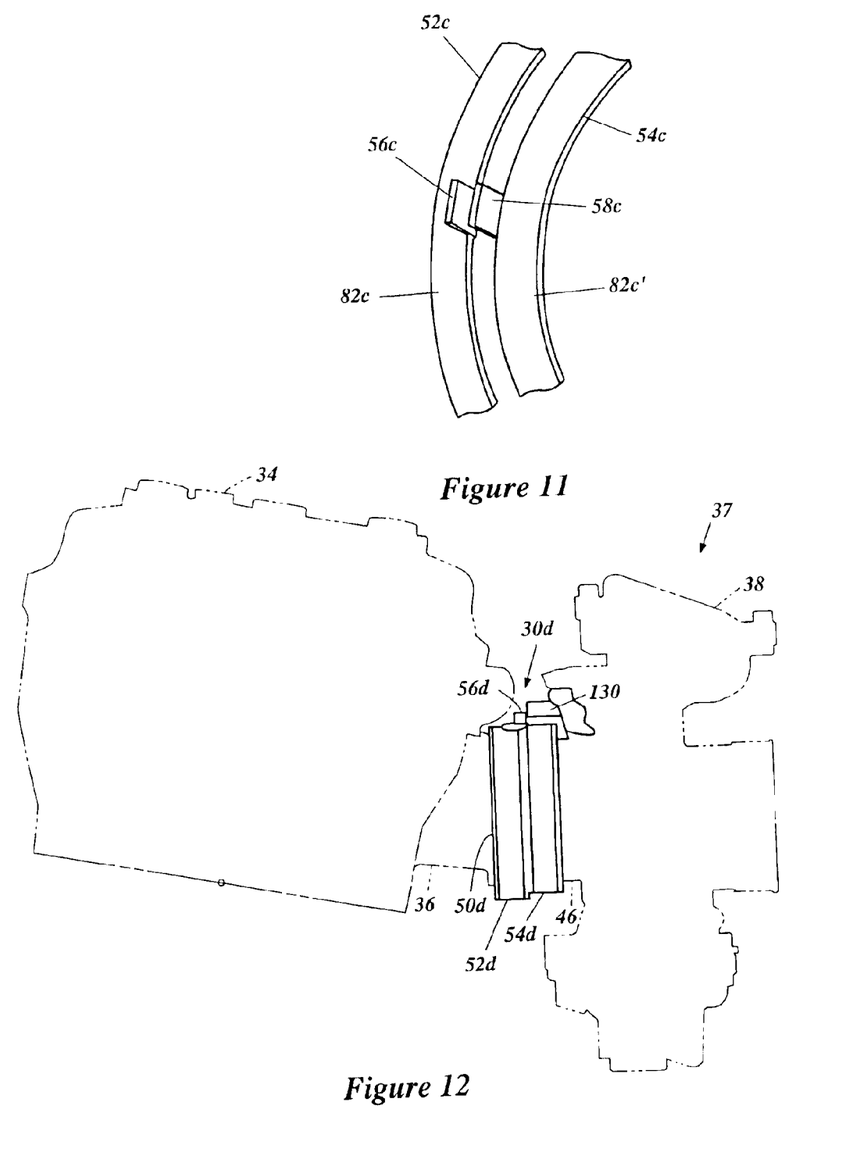
FIG. 11 is yet another modification of the band clamps illustrated in FIG. 2.
FIG. 12 is a modification of the connector assembly illustrated in FIG. 2.

With reference to FIG. 11, yet another modification of the band clamps 52, 54 are illustrated therein and identified generally by the reference numerals 52C, 54C. Components of the band clamps 52C, 54C, which are the same or similar to corresponding components of the band clamps 52, 54 are identified with the same reference numerals, except that a "C" has been added thereto.

As shown in FIG. 11, the projections 56C, 58C are in the form of flat plate like members extending radially outwardly from lateral edges of the band members 82C, 82C', respectively. Preferably, the projections 56C, 58C are formed monolithically with the band members 82C, 82C'.

For example, the band members 82C, 82C' can be formed with a punching or pressing step, in which the band members 82C, 82C' are cut initially from a sheet material. The die used for such a stamping processing can include cut-outs leaving projections extending laterally from edges of the band members 82C, 82C'. Afterward, the projections can be bent in a radially outward direction, thus forming the projections 56C, 58C, illustrated in FIG. 11.

This modification provides additional cost savings because the projections 56C, 58C can be formed quickly and inexpensively. Additionally, in this form, the projections 56C, 58C can provide a laterally extending dimension, similar to the lateral projection of the projections 56, 58 illustrated in FIG. 5 and identified by the reference letter S. For example, in the process of bending the initially flat portions of the band members 82C, 82C', the extent to which the projections 56C, 58C project beyond a lateral edge of the respective band members 82C, 82C' can be controlled by adjusting the point at which the projections are bent.

With reference to FIG. 12, a modification of the connector assembly 30 is illustrated therein and identified generally by reference numeral 30D. Components of the connector assembly 30D which are the same or similar to the connector assembly 30 are identified with the same reference numerals, except that a "D" has been added thereto.

The connector assembly 30D includes first and second band clamps 52D, 54D. The band member 52D can be in the form of any of the above described band clamps 52, 52A, 52B, 52C. Thus, the projection 56D can be constructed in accordance with the descriptions set forth above with respect to the projections 56, 56A, 56B, 56C.

The band clamp 54D can be in the form of any conventional band clamp, including those widely known in the prior art as well as any of the band clamps 54, 54A, 54B, 54C described above.

The connector assembly D also includes an alignment member 130 extending from either the cylinder head 34 or the induction device. 37. In the illustrated embodiment, the alignment member 130 extends from the carburetor 38. The alignment member 130 is positioned on the carburetor 38 so as to be positioned a predetermined distance above the band clamp 46D. Thus, the alignment member 130 does not interfere with the installation of the resilient body 50D onto the outlet flange 46, or the tightening of the band clamp 54D around the inlet flange 64 of the resilient body 50.

However, the alignment member 130 is spaced sufficiently close to the resilient body 50D such that an end of the alignment member 130 can contact the projection 56D if the band clamp 52D is moved toward the alignment member 130. Thus, the alignment member 130 and the projection 56D cooperate to prevent the band clamp 52D from overlapping the band clamp 54D.

A preferred method for attaching the induction device 37 to the engine 34 is described below with reference to FIGS. 2 through 12. In the method described below, only the connector assembly 30 and the band clamps 52, 54 are referred to expressly. However, it is to be understood that any of the band clamps 52, 50, 52A, 52B, 52C, 52D, 54, 54A, 54B, 54C can be used, in any combination thereof.

First, the band clamps 52, 54 are disposed around the outer surfaces 66b, 64b, respectively, of the resilient body 50. Preferably, the projections 56, 58 are aligned with each other and oriented so as to be on a generally upper portion of the connector assembly 30.

The outlet flange 66 of the resilient body 50 is then disposed over the inlet duct 36, so as to seat the projection 76 into the annular recess 80. Then, the outlet flange 46 of the induction device 37 is inserted into the inlet flange 64 of the resilient body 50. Additionally, the outlet duct 46 is inserted sufficiently into the resilient body 50 so as to seat the projection 66 into the annular recess 60. Up to this point, the bolts 106, 106' are in a loosened state.

With the outlet and inlet ducts 46, 36 seated in the inlet and outlet flanges 64, 66, the band clamps 52, 54 are then rotated so that the projections 56, 58 are accurately aligned with each other and so that the bolts 106, 106' are facing upwardly. The bolts 106, 106' are then tightened so as to properly constrict the inlet and outlet flanges 64, 66 against the outlet and inlet ducts 46, 36.

In this orientation, a worker can tighten the bolts 106, 106' in a comfortable position. Additionally, the worker can easily ascertain the position of the projections 56, 58 so as to ensure they remain aligned with each other so that the band clamps 52, 54 do not overlap with each other.

A similar method can be used for connecting the induction device 37 to the engine 34 using the connector assembly 30D illustrated in FIG. 12. With this embodiment, after the outlet and inlet ducts 46, 36 have been inserted into the resilient body 50, the band clamps 52D, 54D are rotated such that the corresponding tensioning devices 84D, 84D', are aligned with each other and facing generally upwardly, and so that the projection 56D is aligned with the alignment member 130. As such, as noted above, an assembly worker can tighten the bolts of the tensioning devices on the band clamps 52D, 54D, while monitoring the alignment of the projection 56D with the alignment member 130 which thereby ensures that the band clamp 52D does not overlap the band clamp 54D.

Although this invention has been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of this inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the inventions herein disclosed should not be limited by the particular disclosed embodiments described above, but should be determined only by a fair reading of the claims that follow.

What is claimed is:

1. An engine comprising an engine body defining at least one combustion chamber therein and including an intake air passage having an opening on an exterior of the engine body, an intake air member having an outlet and being configured to guide air to the opening, a resilient connector member having an inlet and an outlet, a first clamp compressing the inlet of the resilient connector to the outlet of the intake air member, and a second clamp compressing the outlet of the resilient connector to the opening of the intake air passage, the first and second clamps including first and second tension adjuster devices, respectively, at least one of the first and second clamps including a projection spaced from the corresponding tension adjuster devices and configured to prevent the clamps from overlapping each other.

2. The engine according to claim 1, wherein both the first and second clamps include projections aligned with each other in a juxtaposed relationship.

3. The engine according to claim 1, wherein the at least one projection is disposed approximately 90 degrees from the corresponding tension adjuster device.

4. The engine according to claim 1, wherein the tension adjuster devices are configured to generate tension in the first and second clamps.

5. The engine according to claim 1, wherein the at least one projection is disposed on an upper portion of the connector member and the tension adjuster devices are positioned on a side of the connector member.

6. A band clamp comprising a circumferentially extending body member, a tension adjuster device configured to adjust a tension in the body member, and a projection extending radially outwardly from the body member and being spaced circumferentially from the tension adjuster device.

7. The band clamp according to claim 6, wherein the projection comprises at least one flange connected to an outer surface of the body member and a boss portion disposed to radially outwardly from the flange.

8. The band clamp according to claim 7, wherein the body member to find a central axis, the outer surface of the body member extending generally parallel to the axis, and wherein at least to portion of the boss portion extends beyond a periphery of the body member along a direction parallel to the axis.

9. The band clamp according to claim 6, wherein the projection is formed monolithically with the body member.

10. The band clamp according to claim 9, wherein the projection comprises a convex portion of the body member.

11. The band clamp according to claim 9, wherein the projection comprises a portion of the body member extending from a lateral edge of the body member and having been bent toward the radially outward direction.

12. A connector assembly comprising a resilient connector member having first and second connector flanges, a first band clamp configured to constrict the first connector flange, the first band clamp comprising a first band member and a first tensioning device configured to adjust a tension in the band member, the second band clamp configured to constrict the second connector flange, a second band clamp comprising a second band member and a second tensioning device configured to adjust a tension in the second band member, at least the first band member further comprising a first projection extending outwardly from an outer surface of the first band member and being circumferentially spaced from the first tensioning device.

13. The connector assembly according to claim 12 additionally comprising a second projection extending outwardly from an outer surface of the second band member.

14. The connector assembly according to claim 13, wherein the second projection is circumferentially spaced from the second tensioning device.

15. The connector assembly according to claim 13, wherein the first projection is spaced from the first tensioning device at a first distance, and wherein the second projection is spaced from the second tensioning device at a second distance, the first and second distances being about the same.

16. The connector assembly according to claim 12, wherein the first connector flange is larger than the second connector flange.

17. The connector assembly according to claim 12, wherein the first and second connector flanges are closely spaced.

18. The connector assembly according to claim 12, wherein the first connector flange is configured to mate with an air induction device, and wherein the second connector flange is configured to mate with an intake manifold of an internal combustion engine.

19. A connector assembly comprising a resilient connector member having first and second connector flanges, a first band clamp configured to constrict the first connector flange, the first band clamp comprising a first band member and a first tensioning device configured to adjust a tension in the first band member, a second band clamp configured to constrict the second connector flange, the second band clamp comprising a second band member and a second tensioning device configured to adjust a tension in the second band member, at least one of the first and second band clamps including means for preventing the first band member from overlapping a portion of the second band member that is spaced from the second tensioning device.

20. The connector assembly according to claim 19, wherein the first connector flange is configured to sealingly engage in induction device and the second connector flanges configured to engage an intake air opening on an internal combustion engine.

21. The connector assembly according to claim 19, wherein each of the first and second band clamps includes the means for preventing at positions spaced from the respective first and second tensioning devices.

* * * * *